US007598629B2

(12) United States Patent
Brown et al.

(10) Patent No.: US 7,598,629 B2
(45) Date of Patent: Oct. 6, 2009

(54) CONTROL CIRCUIT FOR A REMOTELY CONTROLLED CIRCUIT BREAKER

(75) Inventors: Scott R. Brown, Wake Forest, NC (US); Rodney B. Washington, Raleigh, NC (US); George E. Burke, Jr., Raleigh, NC (US)

(73) Assignee: Square D Company, Palatine, IL (US)

( * ) Notice: Subject to any disclaimer, the term of this patent is extended or adjusted under 35 U.S.C. 154(b) by 100 days.

(21) Appl. No.: 12/005,670

(22) Filed: Dec. 28, 2007

(65) Prior Publication Data

US 2009/0167100 A1 Jul. 2, 2009

(51) Int. Cl.
*G06F 13/40* (2006.01)

(52) U.S. Cl. ........................................ 307/134

(58) Field of Classification Search ................ 307/134
See application file for complete search history.

(56) References Cited

U.S. PATENT DOCUMENTS 4,575,714 A * 3/1986 Rummel .................... 340/468

* cited by examiner

*Primary Examiner*—Robert L. Deberadinis

(57) ABSTRACT

Circuit for determining the presence or absence of a remotely controlled circuit beaker connection to a control circuit and the current state of an internal operating device of a remotely controlled circuit breaker connected to a control circuit.

23 Claims, 5 Drawing Sheets

CONTROL CIRCUIT FOR A REMOTELY CONTROLLED CIRCUIT BREAKER

CROSS-REFERENCE TO RELATED PATENTS

Not applicable

STATEMENT REGARDING FEDERALLY SPONSORED RESEARCH OR DEVELOPMENT

Not applicable

FIELD OF THE INVENTION

The present invention relates to remotely controlled circuit breakers, and particularly to control circuits for remotely controlled circuit breakers.

BACKGROUND OF THE INVENTION

Circuit breakers are typically found in load centers, service entrance boxes or auxiliary circuit panels and are generally intended for manual operation by humans. However, in some applications remote or automatic operation of the circuit breaker may be required or desirable. In these situations a remotely controlled circuit breaker can be used. Remotely controlled circuit breakers generally include an internal operating device, such as a motor or solenoid that operates a movable contact inside the circuit breaker in response to a remotely generated operating signal. A circuit breaker controller provides the remotely generated operating signal to the internal operator. The controller may be located inside the load center or at some remote location outside the load center. The controller can have one or more ports or terminal sets, each being connectable to the control wires of one remotely controlled circuit breaker. In its simplest form, the controller simultaneously controls the OPEN/CLOSE operation of the controlled contacts in all remotely controlled circuit breakers connected to the controller. In a more sophisticated controller, the connected circuit breakers can be operated in a particular time sequence, connection sequence or independently depending on the parameters provided in the controller's programming. Therefore, it is important for the controller to know how many remotely controlled breakers are connected, the port to which they are connected and the status of each controlled circuit breaker's internal operating device with respect to the controllable positions (OPEN or CLOSED) of its controlled contacts.

SUMMARY OF THE INVENTION

The present invention provides a simple circuit arrangement that will provide information to a remote circuit breaker controller about the number of remotely controlled circuit breakers connected to the controller and the status of each connected circuit breaker's internal operating device.

BRIEF DESCRIPTION OF THE DRAWINGS

The features of the invention will be more clearly understood from the following detailed description of the invention read together with the drawings in which.

Figure 1:
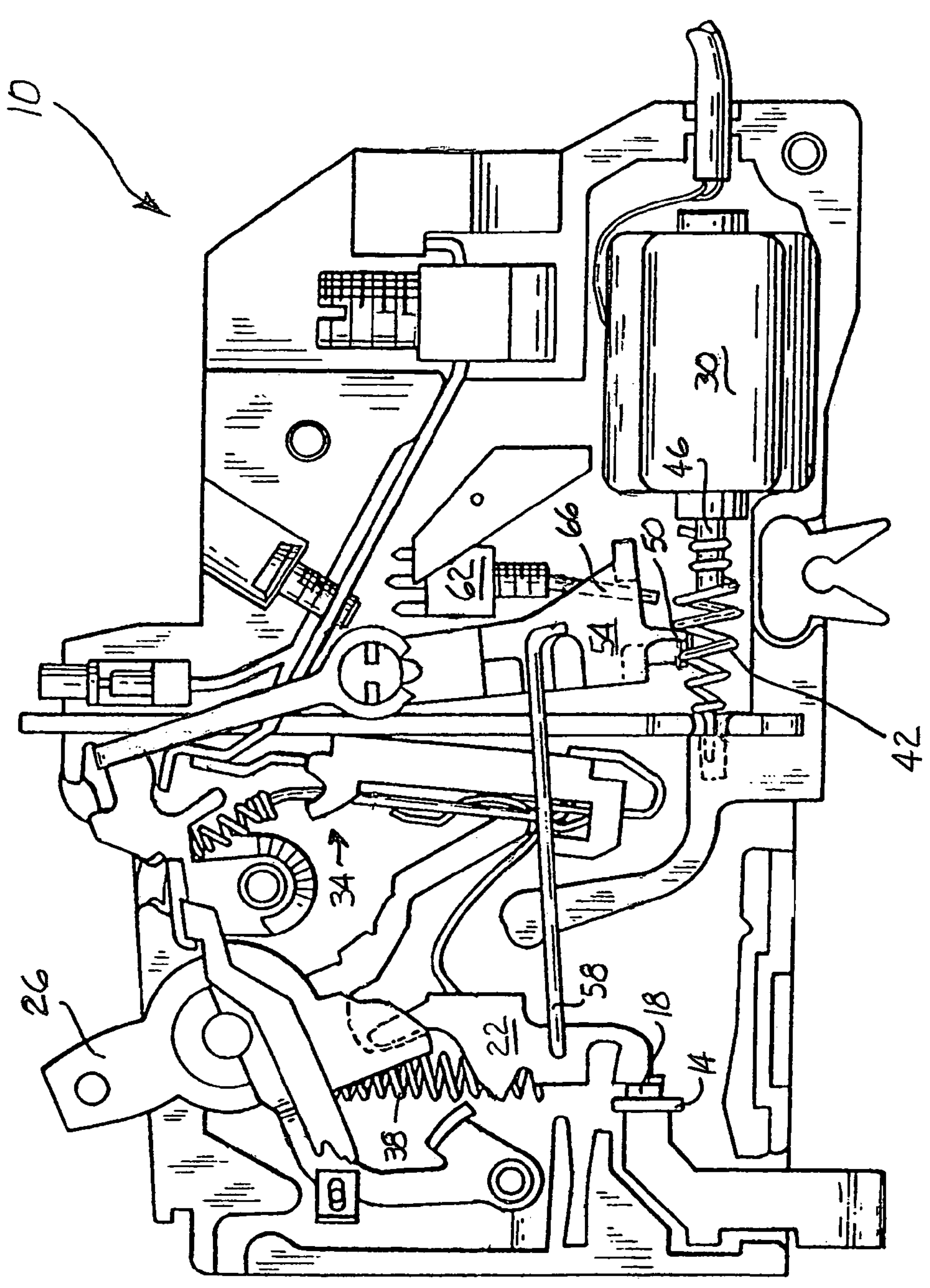
FIG. 1 illustrates in general an internal view of a remotely controlled circuit breaker (contacts CLOSED) known in the art with which the circuit of the present invention is intended to operate.

Before one embodiment of the invention is explained in detail, it is to be understood that the invention is not limited in its application to the details of construction described herein or as illustrated in the drawings. The invention is capable of other embodiments and of being practiced or being carried out in various other ways. Further, it is to be understood that the phraseology and terminology used herein is for the purpose of description and should not be regarded as limiting.

DETAILED DESCRIPTION OF THE DRAWINGS

Figure 2:
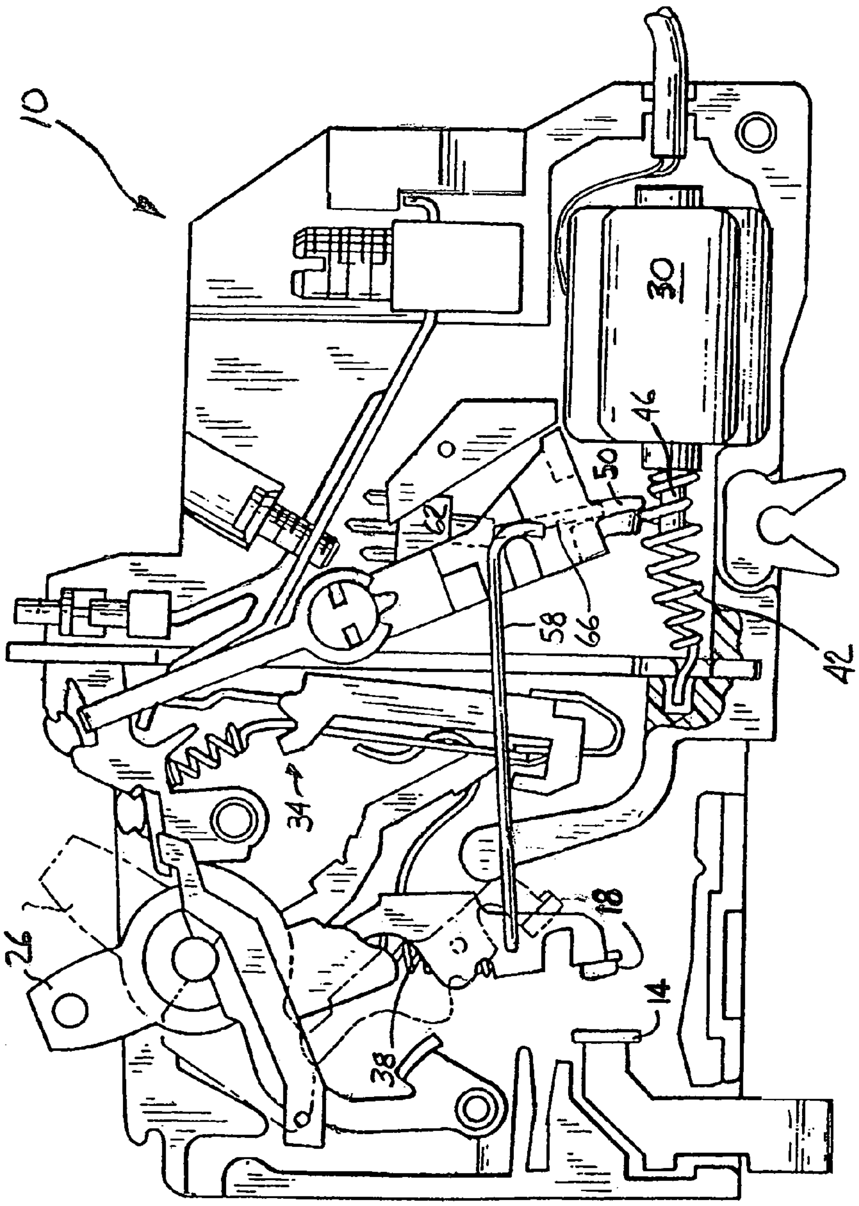
FIG. 2 illustrates in general an internal view of a remotely controlled circuit breaker (contacts OPEN) known in the art with which the circuit of the present invention is intended to operate.

FIGS. 1 and 2 illustrate a remotely controlled circuit breaker generally indicated by reference numeral 10. A comprehensive description of the circuit breaker 10 can be found in U.S. Pat. No. 4,623,859, only those components required for understanding the present invention will be described herein. The breaker 10 includes at least one stationary contact 14 and at least one movable contact 18. The movable contact 18 is attached to a pivotably supported carrier 22. The stationary contact 14 and movable contact 18 are electrically in series between a power source and a load, such that when the movable contact 18 is in a contact CLOSED position (FIG. 1), the load is electrically connected to the source and when the movable contact 18 is in a contact OPEN position (FIG. 2), the load is disconnected from the source. The carrier 22 and its attached movable contact 18 are movable between the contact CLOSED position and the contact OPEN position locally by operating a handle 26 or remotely by an internal movable contact operating device such as a motor 30. The movable contact 18 can also be moved from the contact CLOSED position to the contact OPEN position by an overload trip mechanism 34. The movable contact 18 is maintained in the contact CLOSED position by an over center biasing spring 38, which also maintains the contact OPEN position (dashed lines in FIG. 2) when operated by either the handle 26 or overload trip mechanism 34. The contact OPEN position resulting from operation of the motor 30 (solid lines in FIG. 2), places the movable contact 18 at a position between the contact CLOSED position and the spring biased contact OPEN position. This intermediate position is a sufficient distance from the stationary contact 14 to prevent current flow and/or arcing between the stationary contact 14 and movable contact 18, but not past the equilibrium position of biasing spring 38. From this position only, the remotely controlled motor 30 can move the movable contact 18 to the contact CLOSED position of FIG. 1.

The motor 30 is operated by a DC current, with the direction of rotation (clockwise or counter clockwise) being determined by the polarity of the DC current applied to the motor 30. A gear spring 42 is attached to the motor shaft 46 for common rotation therewith. The gear spring 42 engages a tooth 50 on the end of an actuator 54 such that the actuator 54 is moved back and forth in a pivotal arc as the motor shaft 46 is operated in clockwise and counterclockwise directions. Arcuate movement of the actuator 54 is transferred to the carrier 22 by an operating rod 58. Starting from the movable contact CLOSED position of FIG. 1; rotation of the motor shaft 46 in the clockwise direction will cause the actuator 54, operating rod 58, carrier 22 and attached movable contact 18 to be drawn away from the stationary contact 14 to the movable contact OPEN position of FIG. 2 (solid lines). After the movable contact 18 has reached the movable contact OPEN position a motor shut off switch 62 disconnects the motor 30 from the DC power source. The motor shut off switch 62 has a movable disconnect toggle 66 coupled to the actuator 54 for movement therewith between a first toggle position corresponding to the movable contact CLOSED position and a second toggle position corresponding to the movable contact OPEN position. To remotely operate the movable contact 18 from the contact OPEN position to the contact CLOSED position the polarity of the DC voltage applied to the motor 30 is reversed, thus reversing the operation described above.

Figure 3:
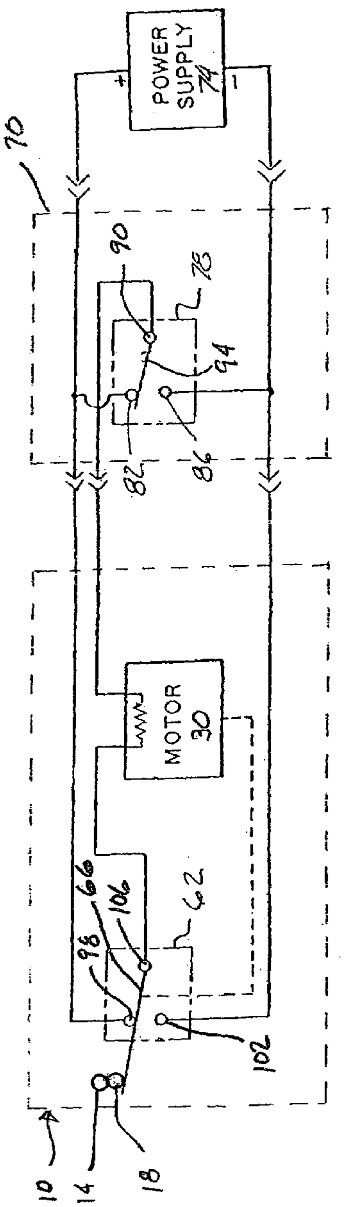
Fig. 3 PRIOR ART
FIG. 3 illustrates a typical control circuit for the remotely controlled circuit breaker of FIGS. 1 and 2 with the movable contact in the CLOSED position.
Figure 4:
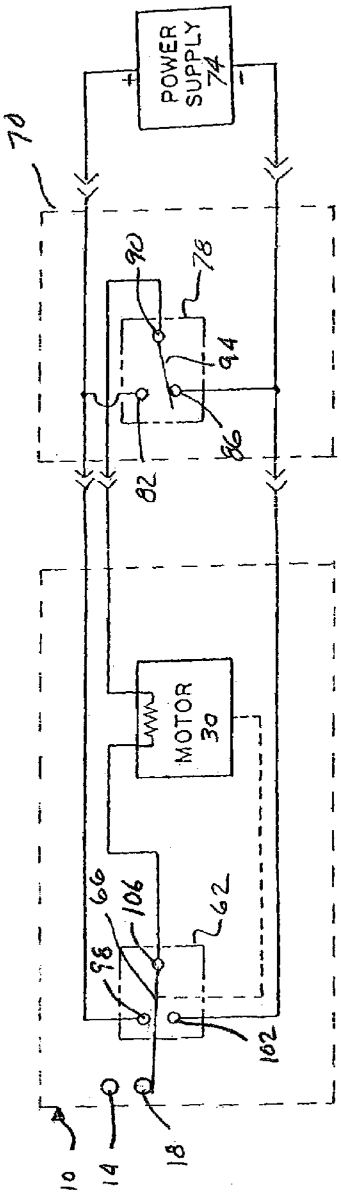
Fig. 4 PRIOR ART
FIG. 4 illustrates a typical control circuit for the remotely controlled circuit breaker of FIGS. 1 and 2 with the control switch initiating a movable contact OPEN command.
Figure 5:
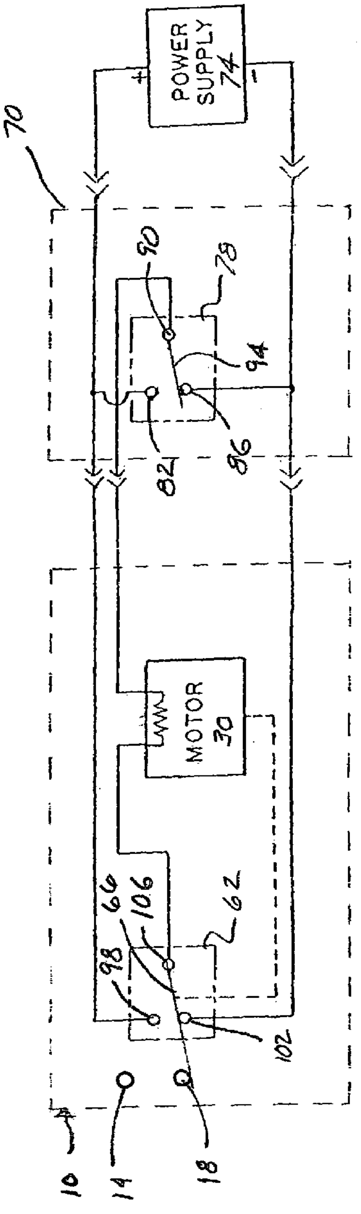
Fig. 5 PRIOR ART
FIG. 5 illustrates a typical control circuit for the remotely controlled circuit breaker of FIGS. 1 and 2 at the completion of the movable contact OPEN command with the movable contact in the OPEN position.

FIGS. 3-5 illustrate a circuit diagram of a typical circuit breaker remote operating circuit 70, as is known in the art, and its connection to the remotely operated circuit breaker 10 and a DC power supply 74. The remote operating circuit 70 includes a two position control switch 78 that has a first power terminal 82 connected to the positive terminal of power supply 74, a second power terminal 86 connected to the negative terminal of power supply 74 and a common power terminal 90, electrically connected to a control toggle 94 and a first terminal of the motor 30. The control toggle 94 can be operated manually, electrically, by a timer or a logic circuit, between a first position in which it electrically connects the common power terminal 90 to the first power terminal 82 (FIG. 3) or a second position in which it electrically connects the common power terminal 90 to the second power terminal 86 (FIGS. 4 and 5). Depending on which of the first or second power terminals, 82 and 86 respectively, the control toggle 94 is connected to, power from either the positive or negative terminal of the DC power supply 74 can be applied to the motor 30. Thus remote operation of the movable contact 18 via the motor 30 is accomplished by moving the control toggle 94 between its two positions.

The disconnect toggle 66 of motor shut off switch 62 in circuit breaker 10 moves between a first disconnect terminal 98 connected to the positive power supply terminal (FIG. 3) and a second disconnect terminal 102 connected to the negative power supply terminal (FIG. 5). The disconnect toggle 66 is electrically connected to a common disconnect terminal 106, which is also electrically connected to a second terminal of the motor 30. When control toggle 94 of control switch 78 in the remote operating circuit 70 is moved from one of the first or second power terminals, 82 or 86 respectively to the other of the first or second power terminals, 82 or 86 respectively, DC current from power supply 74 is applied to motor 30 through common power terminal 90 and returns to the power supply 74 through common disconnect terminal 106 and one of the first or second disconnect terminals, 98 or 102 respectively, of motor shut off switch 62, causing the motor 30 to rotate in one of the clockwise or counterclockwise directions. As the motor shaft 46 rotates causing actuator 54 to pivot, disconnect toggle 66 of motor shut off switch 62 moves toward the other of first or second disconnect terminals, 98 or 102 respectively (FIG. 4). As the disconnect toggle 66 disconnects from the first or second disconnect terminals 98 or 102 respectively, the motor 30 is disconnected from DC power supply 74. Movement of control toggle 94 to the other of first or second power terminals, 82 or 86 respectively, causes an operation of motor 30 and movement of disconnect toggle 66 of motor shut off switch 62 in the opposite direction. Therefore, it can be seen that each operation of the control toggle 94 of control switch 78 causes a change in the CLOSED or OPEN position of the movable contact 18. At the conclusion of each remote operation of the circuit breaker 10, the disconnect toggle 66 of motor shut off switch 62 and control toggle 94 of control switch 78 are both connected to the same terminal (positive or negative) of DC power supply 74. Therefore, the remote operating circuit 70 is open. The open remote operating circuit 70 has no means for detecting the presence of a remotely operated circuit breaker 10 or the current state of a connected remotely operated circuit breaker's internal movable contact operating device (motor 30).

Figure 6:
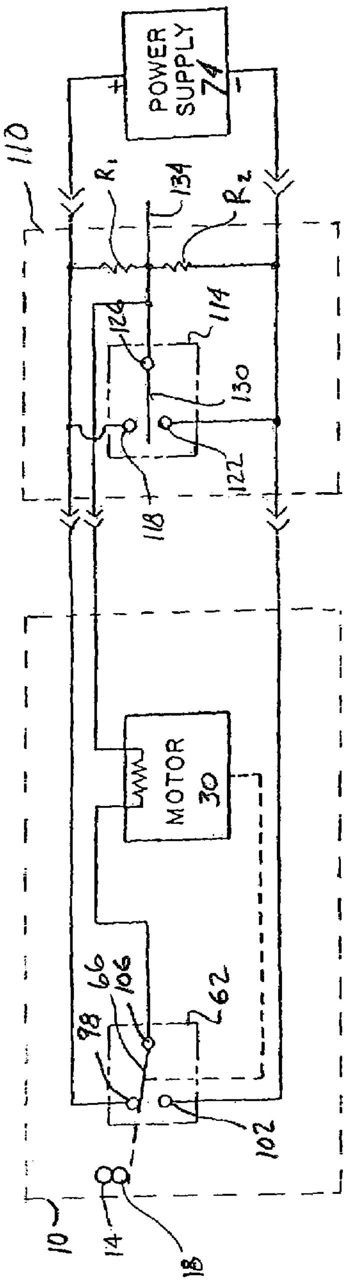
FIG. 6 illustrates a first embodiment of the control circuit of the present invention.

FIG. 6 illustrates a first embodiment of a circuit for indicating the presence of a connected remotely controlled circuit breaker 10, and the position of it's movable contact operating device (motor 30) and contact actuator 54, the circuit being configured in accordance with the present invention and generally represented by reference numeral 110. It is to be understood that the CLOSED position of the movable contact 18 of circuit breaker 10 can not be positively determined by this circuit since operation by either of the operating handle 26 or overload trip mechanism 34 will override a remotely closed movable contact 18. Control circuit 110 includes a three position control switch 114 instead of the two position control switch 78 of control circuit 70. The three position control switch 114 has a first power terminal 118 connected to the positive terminal of power supply 74, a second power terminal 122 connected to the negative terminal of the power supply 74 and a common power terminal 126 connected to a toggle 130, movable between the first and second power terminals, 118 and 122 respectively, and the first terminal of the motor 30 in circuit breaker 10. The control switch 114 is essentially a normally open two position momentary toggle switch wherein the toggle 130 has three positions, a normal center position where no electrical connection is made by the toggle 130, a first momentary position wherein the toggle 130 is momentarily connected to the first power terminal 118 and a second momentary position wherein the toggle 130 is momentarily connected to the second power terminal 122. The control circuit 110 also includes sensing resistors $R_1$ and $R_2$, which are electrically in series with each other and electrically in parallel with motor shut off switch 62 and control switch 114 across DC power supply 74. Sensing resistor $R_1$ is electrically connected between the positive terminal of the power supply 74 and common power terminal 126 of control switch 114. Sensing resistor $R_2$ is electrically connected between the negative terminal of power supply 74 and common power terminal 126 of control switch 114. Thus there will always be a small leakage current flowing through sensing resistors $R_1$ and $R_2$ causing a voltage drop across each of the sensing resistors $R_1$ and $R_2$. Since the leakage current will also flow through the motor 30 of any connected remotely controlled circuit breaker 10, the resistance value of sensing resistors $R_1$ and $R_2$ should be high enough to prevent the motor 30 from attempting to operate and any overheating of the motor 30 due to the leakage current after the toggle 130 has returned to its normally open position. A sense line 134 is connected between sensing resistor $R_1$ and $R_2$ at the common power terminal 126 of control switch 114. The resistance values for sensing resistors $R_1$ and $R_2$ should be selected such that they are approximately equal. The sense line 134 will see one of a HIGH, INTERMEDIATE or LOW voltage depending on whether the actuator 54 and motor 30 are in the movable contact CLOSED position, no remotely controlled circuit breaker 10 is connected to the control circuit 110 or the actuator 54 and motor 30 are in movable contact OPEN position, respectively. Since the motor 30 is electrically in parallel with sensing resistors $R_1$ and $R_2$, and has a very low resistance value compared to sensing resistors $R_1$ and $R_2$, it will effectively short out one of the sensing resistors $R_1$ or $R_2$. The sensing resistor $R_1$ or $R_2$, which is shorted out will depend on the position of the disconnect toggle 66 in motor shut off switch 62, as determined by the movable contact OPEN or movable contact CLOSED position of the actuator 54. The sense line 134 can be connected to a microprocessor 138 (FIG. 9), which uses the sensed information to determine how many remotely controlled circuit breakers 10 are connected to the control circuit 110 and the state of each connected remotely controlled circuit breaker's movable contact operating device (motor 30) and contact actuator 54. Connection to the microprocessor 138 may require additional circuit element to provide the correct sensing levels.

Figure 7:
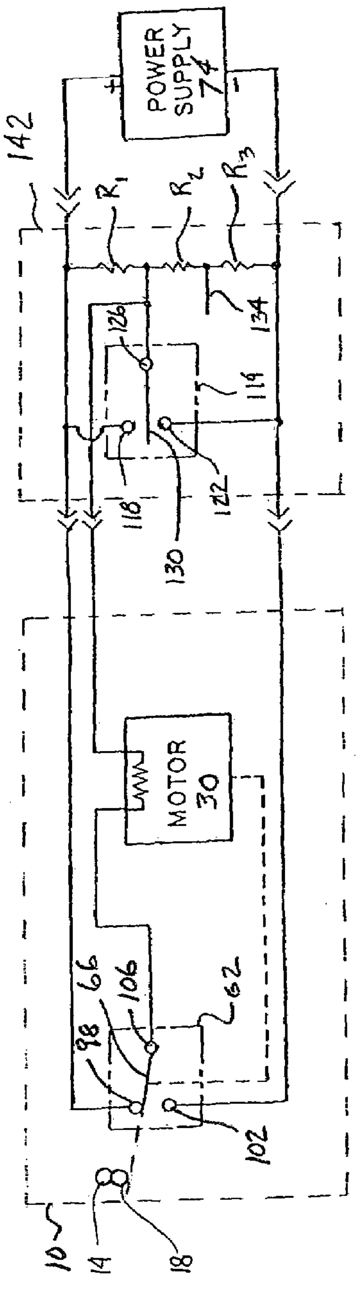
FIG. 7 illustrates a second embodiment of the control circuit of the present invention.

FIG. 7 illustrates a second embodiment of a circuit for determining the presence of a connected remotely controlled circuit breaker 10, and the position of it's movable contact operating device (motor 30) and contact actuator 54, the circuit configured in accordance with the present invention and generally represented by reference numeral 142. The circuit 142 is generally the same as circuit 110 with an additional sensing resistor $R_3$ having a resistance value significantly lower than sensing resistors $R_1$ and $R_2$. In circuit 142 sensing resistor $R_3$ is electrically in series with sensing resistors $R_1$ and $R_2$ such that it is electrically connected between the negative terminal of power supply 74 and sensing resistor $R_2$. As in the first embodiment, there will always be a small leakage current flowing through the sensing resistors $R_1$, $R_2$ and $R_3$ causing a voltage drop across each of the sensing resistors $R_1$, $R_2$ and $R_3$. Therefore, as indicated with respect to the first embodiment, the resistance values of sensing resistors $R_1$, $R_2$ and $R_3$ should be selected such that the motor 30 will not attempt to operate nor will the leakage current cause heating of the motor 30 after the toggle 130 has returned to its normally open position. The resistance values of sensing resistors $R_1$, $R_2$ and $R_3$ are also selected to provide the proper sensing levels for the microprocessor 138 connected to sensing line 134. The sense line 134 is connected between sensing resistor $R_2$ and $R_3$ such that it will see one of a HIGH, LOW or INTERMEDIATE voltage depending on whether the actuator 54 and motor 30 are in the movable contact CLOSED position, movable contact OPEN position or if there is no remotely controlled circuit breaker 10 connected to the control circuit 142, respectively.

Figure 8:
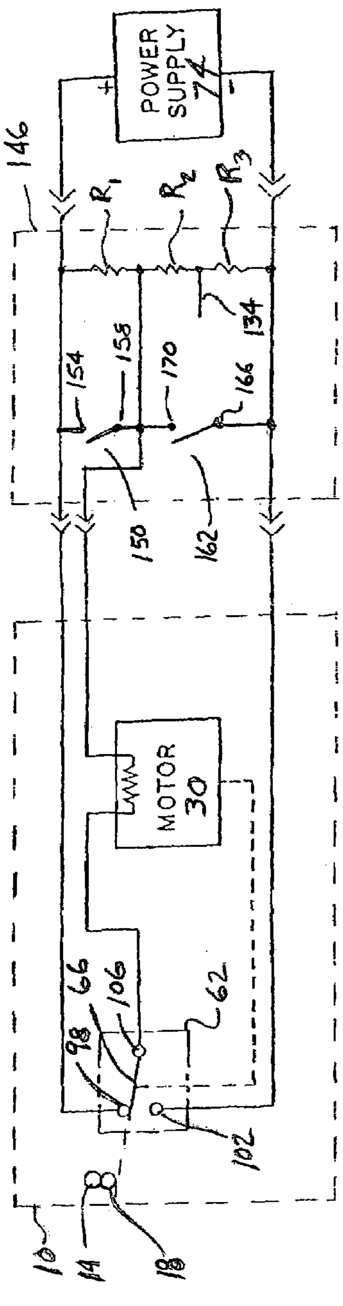
FIG. 8 illustrates a second embodiment of the control circuit of the present invention.

FIG. 8 illustrates a third embodiment of a circuit for determining circuit breaker presence and contact states configured in accordance with the present invention and generally indicated by reference number 146. In circuit 146 the three position control switch 114 is replaced with a first normally open control switch 150 having a first power terminal 154 and a second terminal 158 and a second normally open control switch 162 having a first power terminal 166 and a second terminal 170. The first power terminal 154 of first normally open control switch 150 is connected to the positive terminal of power supply 74 and the first power terminal 166 of second normally open control switch 162 is connected to the negative terminal of power supply 74. The second terminals 158 and 170 of first and second normally open control switches, 150 and 162 respectively, are connected to the first terminal of motor 30 in a connected remotely controlled circuit breaker 10. Control switches 150 and 162 are arranged in parallel with sensing resistors $R_1$, $R_2$ and $R_3$ as described above in the second embodiment. First and second normally open control switches, 150 and 162 respectively, can be either mechanically or electrically operated to their closed position for a short period of time such that a short pulse of DC current from the power supply 74 is applied to the first terminal of motor 30 in a connected remotely controlled circuit breaker 10. Depending on which of the first or second normally open control switches, 150 and 162 respectively, is operated the motor 30 will operate in either the clockwise or counter clockwise direction. The first and second normally open control switches, 150 and 162 respectively, are interlocked such that only one can be operated to its closed position at a time. Closing of either normally open control switch 150 or 162 causes the remote operation of the motor 30, actuator 54, carrier 22, movable contact 18 and motor shut off switch 62 as described above, provided that the movable contact 18 of a connected remotely controlled circuit breaker 10 is not already in the contact OPEN or contact CLOSED position associated with the normally open control switch 150 or 162 being activated.

Figure 9:
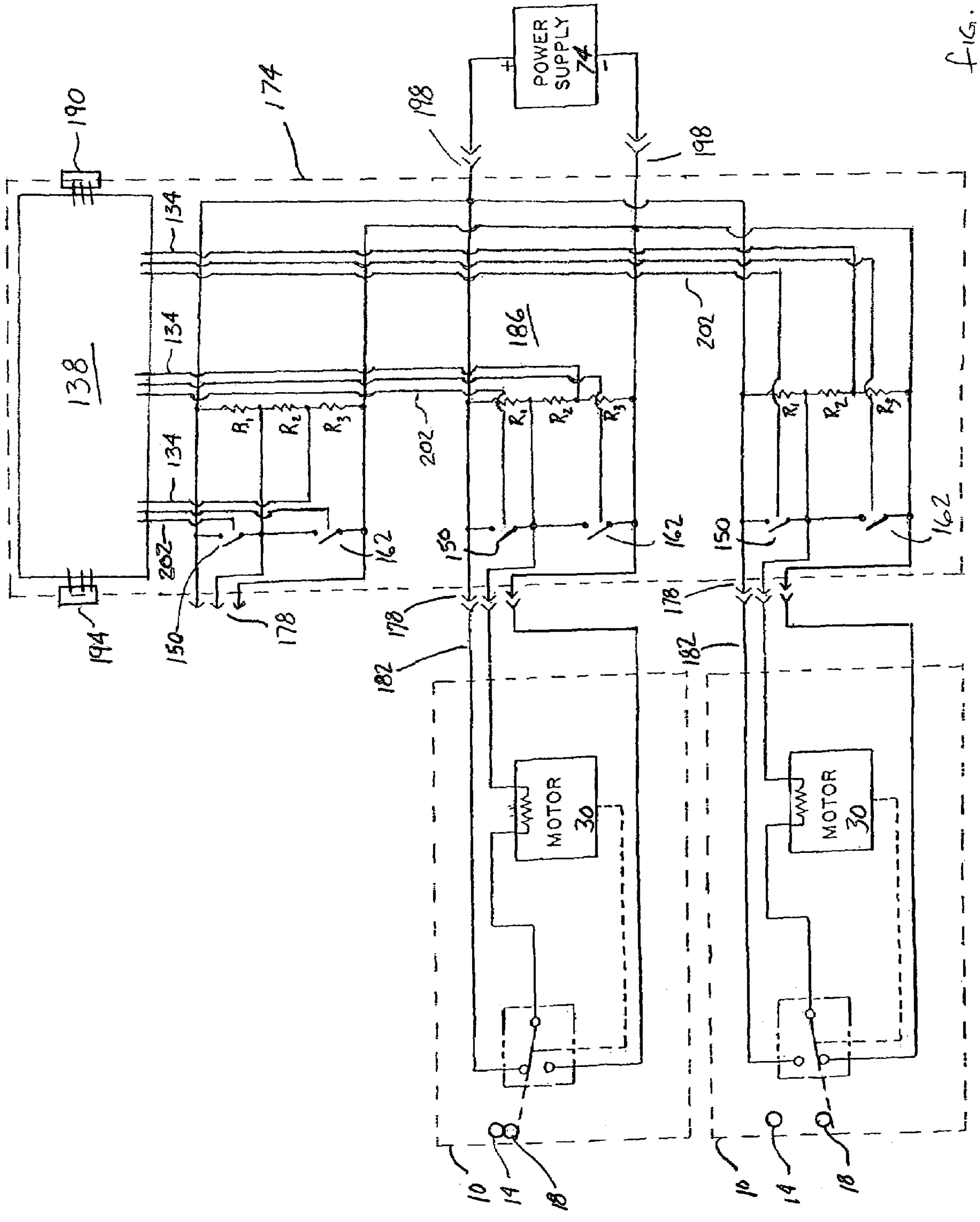
FIG. 9 illustrates three control circuits of the present invention in a controller module with connections to a microprocessor, one control circuit connected to a remotely controlled circuit breaker with its movable contact in the CLOSED position, one control circuit connected to a remotely controlled circuit breaker with its movable contact in the OPEN position and one control circuit not connected to a circuit breaker.

FIG. 9 illustrates the circuit 146 of FIG. 8, as it would be used in a control module, generally indicated as reference number 174, for controlling a number of remotely controllable breakers 10. The control module 174 includes a number of circuit breaker ports 178 for connecting to the control wiring 182 from each of the connected remotely controlled circuit breakers 10 being controlled by the control module 174. The circuit breaker ports 178 can be configured as commercially available multi-pin plug-in terminals, such as the Molex, Inc. 39-30-2030 or individual wire connecting terminals attached to a printed wiring board 186. From the circuit breaker ports 178 traces on the printed circuit board connect each connected remotely controlled circuit breaker 10 to the microprocessor 138, which controls the operation of the connected remotely controlled circuit breakers 10. The microprocessor 138 can be programmed by any convenient method. An external higher level control device, such as the Kohler Power Systems MPAC 550 Controller, can be connected through a communications port 190 to initiate the control program or algorithm of the microprocessor 138. A secondary port 194 can also be provided for connecting to additional modules 174. The power supply 74 can be located outside the control module 174 and connected through a power supply port 198 or inside the control module 174, if space permits.

The microprocessor 138 can control the operation of each remotely controlled circuit breaker 10 connected to the control module 174 by providing a signal to it's associated three position control switch 114 or normally open control switches 150 and 162 on control wires or traces 202. The microprocessor can only activate one of the normally open control switches 150 or 162 at a time and will not attempt to activate the control switch 114, 150 or 162 if the sensed position of the internal movable contact operating device (motor 30) indicates that it is already in the desired position. The microprocessor 138 also prohibits the reading of the sensing line 134 of any remotely controlled breakers 10 while its associated control switch 114, 150 or 162 is being operated. The microprocessor 138 can control the connected remotely controlled circuit breakers 10 collectively or individually, as required to prevent overloading of the power supply 74.

We claim:

1. A circuit for indicating the presence of a remotely controlled circuit breaker connected to a control circuit for controlling a plurality of remotely controlled circuit breakers, said circuit comprising:

a power supply providing power to the control circuit and a movable contact operating device for remotely operating a movable contact of a connected remotely controlled circuit breaker between an OPEN and a CLOSED position;

a control switch for electrically operating the movable contact operating device of a connected remotely controlled circuit breaker, a shut off switch for stopping the movable contact operating device of a connected remotely controlled circuit breaker after the movable contact has reached one of its OPEN or CLOSED positions;

a plurality of sensing resistors being electrically connected in series with each other and having an electrical connection to a common terminal of the control switch between two of the plurality of sensing resistors, thereby placing at least one of the plurality of sensing resistors electrically in parallel with the movable contact operating device of a connected remotely controlled circuit breaker and;

a sensing line electrically connected between two of the plurality of sensing resistors for providing an output signal indicating weather a remotely controlled circuit breaker is or is not connected to the circuit breaker control circuit.

2. The circuit of claim 1, wherein the sensing line sees a HIGH output signal when the movable contact operating device is in the movable contact CLOSED position, a LOW output signal when the movable contact operating device is in the movable contact OPEN position or an INTERMEDIATE output signal when no remotely controlled circuit breaker is connected to the control circuit.

3. The circuit of claim 1, wherein the control switch includes two power terminals, each being connected to one of a positive or a negative terminal of the power supply and the common terminal of the control switch is further connected to a control toggle and a first terminal of the movable contact operating device of a connected remotely controlled circuit breaker, the control toggle being selectively movable between the first and second power terminals such that the movable contact operating device receives power from the appropriate positive or negative power supply terminal as required to initiate the desired operation of the movable contact operating device for either opening the movable contact or closing the movable contact of the connected remotely controlled circuit breaker.

4. The circuit of claim 3, wherein the shut off switch includes two disconnect terminals, each being connected to one of the positive or negative power supply terminals of the power supply and a common terminal connected to a disconnect toggle and a second terminal of the movable contact operating device, the disconnect toggle being movable between the first and second disconnect terminals in response to movement of the movable contact operating device such that the positive or negative power supply terminal connected to the common terminal and the second terminal of the movable contact operating device is reversed at the end of each operation initiated by the control switch thereby changing the current path through the plurality of sensing resistors to produce a signal at the sensing line indicating the state of the movable contact operating device.

5. The circuit of claim 4, wherein the resistance values of the plurality of sensing resistors are selected to provide a small leakage current in the control circuit that is not capable of operating the movable contact operating device or causing a heating condition in the movable contact operating device after the shut off switch has completed its operation.

6. The circuit of claim 1, wherein the plurality of sensing resistors are electrically in series with the power supply when no remotely controlled circuit breaker is connected to the control circuit.

7. The circuit of claim 1, wherein the movable contact operating device is a motor.

8. A circuit for indicating the presence of a remotely controlled circuit breaker connected to a control circuit for controlling a plurality of remotely controlled circuit breakers, said circuit comprising:

a power supply having positive and negative terminals for providing power to the control circuit and a movable contact operating device for remotely operating a movable contact of a connected remotely controlled circuit breaker between an OPEN and a CLOSED position;

a control switch momentarily connecting a selected one of the positive or negative power supply terminals to a first terminal of the movable contact operating device of a connected remotely controlled circuit breaker, a shut off switch connecting one of the positive or negative power supply terminals to a second terminal of the movable contact operating device;

a plurality of sensing resistor being electrically connected in series with each other and having an electrical connection to the first terminal of the movable contact operating device of a connected remotely controllable circuit breaker such that at least one of the plurality of sensing resistors is electrically in parallel with the movable contact operating device of a connected remotely controlled circuit breaker, and;

a sensing line electrically connected between two of the plurality of sensing resistors for providing an output signal indicating weather a remotely controlled circuit breaker is or is not connected to the circuit breaker control circuit.

9. The circuit of claim 8, wherein the sensing line sees a HIGH output signal when the movable contact operating device is in the movable contact CLOSED position, a LOW output signal when the movable contact operating device is in the movable contact OPEN position or an INTERMEDIATE output signal when no remotely controlled circuit breaker is connected to the control circuit.

10. The circuit of claim 8, wherein the control switch includes a first power terminal connected to the positive terminal of the power supply, a second power terminal connected to the negative terminal of the power supply and a common terminal connected to a control toggle selectively movable between the first and second power terminals, the common terminal being connected electrically to the first terminal of the movable contact operating device and the plurality of sensing resistors.

11. The circuit of claim 8, wherein the shut off switch includes a first disconnect terminal connected to the positive terminal of the power supply, a second disconnect terminal connected to the negative terminal of the power supply and a common terminal connected to a disconnect toggle movable between the first and second disconnect terminals in response to an operation of the movable contact operating device initiated by the control switch, the common terminal being connected electrically to a second terminal of the movable contact operating device.

12. The circuit of claim 11, wherein operation of the shut off switch changes the current path in the control circuit such that at least one of the plurality of sensing resistors is placed electrically in parallel with the movable contact operating device.

13. The circuit of claim 8, wherein the resistance values of the plurality of sensing resistors are selected to provide a small leakage current in the control circuit that is not capable of operating the movable contact operating device or causing a heating condition in the movable contact operating device.

14. The circuit of claim 8, wherein the plurality of sensing resistors includes first and second adjacent sensing resistors having approximately the same resistance value and being electrically connected to the first terminal of the movable contact operating device at their common connection.

15. The circuit of claim 14, wherein the plurality of sensing resistors includes a third sensing resistor connected electrically one of the first and second adjacent sensing resistors, the third sensing resistor having a resistance value significantly lower than the first and second adjacent sensing resistors, the sensing line being electrically connected between the third sensing resistor and the one of the first and second adjacent sensing resistors to which the third sensing resistor is connected.

16. A circuit for indicating the presence of a remotely controlled circuit breaker connected to a control circuit for controlling a plurality of remotely controlled circuit breakers, said circuit comprising:

a power supply providing power to the control circuit and a movable contact operating device for remotely operating a movable contact of a connected remotely controlled circuit breaker between an OPEN and a CLOSED position;

a control switch for electrically operating the movable contact operating device, a shut off switch for stopping the movable contact operating device of a connected remotely controlled circuit breaker once the movable contact has reached one of its OPEN or CLOSED positions;

a first sensing resistor having a first lead connected to a positive terminal of the power supply and a second lead connected to a common terminal of the control switch;

a second sensing resistor having a first lead connected to the second lead of the first sensing resistor and the common terminal of the control switch, and a second lead;

a third sensing resistor having a first lead connected to a negative terminal of the power supply and a second lead connected to the second lead of the second sensing resistor, and;

a sensing line electrically connected between the second and third sensing resistors for providing a HIGH output signal when the movable contact operating device of a connected remotely controlled circuit breaker is in the movable contact CLOSED position, a LOW signal when the movable contact operating device of a connected remotely controlled circuit breaker is in the movable contact OPEN position or an INTERMEDIATE signal when no remotely controlled circuit breaker is connected to the control circuit.

17. The circuit of claim 16 wherein the control switch includes first and second power terminals, each being connected to one of the positive or negative power supply terminals and a common terminal connected to a control toggle and a first terminal of the movable contact operating device of a connected remotely controlled circuit breaker, the control toggle movable between the first and second power terminals.

18. The circuit of claim 16 wherein the shut off switch includes first and second disconnect terminals, each being connected to one of the positive or negative power supply terminals and a common terminal connected to a disconnect toggle and a second terminal of the movable contact operating device of a connected remotely controllable circuit breaker, the disconnect toggle movable between the first and second stationary contacts.

19. The circuit of claim 16 wherein the resistance values of the first and second sensing resistors is approximately the same and the resistance value of the third sensing resistor is significantly lower than the resistance values of the first and second sensing resistors.

20. The circuit of claim 16 wherein the control switch includes two momentary contacts, each having a first power terminal connected to one of the positive or negative terminals of the power supply and a second terminal connected to a first terminal of the movable contact operating device of a connected remotely controlled circuit breaker and the electrically connected leads of the first and second sensing resistors.

21. The circuit of claim 16 wherein a plurality of control circuits are enclosed in a control module each control circuit having a circuit breaker port for receiving control wiring from a connected remotely controlled circuit beaker, the module includes a communications port for receiving higher level control information from an outside source and a secondary port for communicating with additional control modules, one or more control module being installed in an electrical distribution panel.

22. The circuit of claim 16 wherein the control circuit includes a microprocessor that evaluates the output signal of the sensing line to determine if a remotely controlled circuit breaker is or is not connected to the control circuit and if a remotely controlled circuit breaker is connected what sate state of its moveable contact operating device is in.

23. The circuit of claim 22 wherein the microprocessor also determines a sequence for operating the remotely controlled circuit breakers to prevent overloading of the power supply.

* * * * *